United States Patent [19]

Seiden

[11] 4,393,381
[45] Jul. 12, 1983

[54] TRANSFER BUS MATRIX

[75] Inventor: Lewis J. Seiden, Tappan, N.Y.

[73] Assignee: T-Bar Incorporated, Wilton, Conn.

[21] Appl. No.: 222,064

[22] Filed: Jan. 2, 1981

[51] Int. Cl.³ .......................... H04J 6/00; H04Q 9/00
[52] U.S. Cl. ................................ 340/825.83; 370/67;
370/86; 370/95
[58] Field of Search ...................... 340/825.83; 370/80,
370/85, 95, 112, 67

[56] References Cited

U.S. PATENT DOCUMENTS

| | | | |
|---|---|---|---|
| 3,892,925 | 7/1975 | Fisk et al. | 370/67 |
| 3,898,391 | 8/1975 | Schwarzer et al. | 370/67 |
| 3,959,594 | 5/1976 | Srivastava | 370/67 |
| 4,138,597 | 2/1979 | Ashford | 370/67 |
| 4,251,880 | 2/1981 | Baugh et al. | 370/86 |

FOREIGN PATENT DOCUMENTS 54-152903 12/1979 Japan ..................................... 370/95

Primary Examiner—Donald J. Yusko
Attorney, Agent, or Firm—John C. Dorfman

[57] ABSTRACT

A transfer bus matrix provides a single channel of a plurality of conductors to which multiple inputs and multiple outputs are connected by ports or control gates which allow them to be selectively interconnected by control means. Individual matrices or groups of matrices may be involved, including a multistage matrix having individual substage matrices using a transfer bus. Each matrix may be monitored by monitor means having connections to each of the conductors and a multistage matrix may be monitored in each substage and arranged so that each single input may be selectively monitored at various stages throughout the multistage matrix.

20 Claims, 3 Drawing Figures

TRANSFER BUS MATRIX

The present invention relates to a single stage matrix having a transfer bus feature or a multistage matrix system having substage matrices made up of many transfer bus matrices. The transfer bus matrix is useful, for example, in the matrix system of my copending U.S. patent application Ser. No. 222,063, filed contemporaneously with the filing of this application and entitled, "Three Stage Minimum Configuration Conditionally Non-Blocking Matrix". More specifically it relates to transfers within any matrix of signals from any selected input to any selected output or such a transfer within any substage matrix.

My aforesaid copending application refers specifically to switching means, which contemplates both prior art switching and techniques of the present invention.

THE PRIOR ART

Conventional switching means in a prior art matrix has generally meant nodal switching, or switching at each cross-over point of conductors extending from inputs on one side and outputs on the other side of the switching means. The present transfer bus matrix (TBM) invention contemplates complete substitution for all the nodes and internal matrix wiring configurations by a single multi-conductor channel or bus directly between sequentially selected inputs and outputs to achieve the same effective results but at vastly increased operating speeds.

Other non-matrix systems have been used from time to time for somewhat similar purposes but have been dependent to a large extent on a time sharing system involving a master clock and such systems are inherently speed sensitive. Such speed limitations can very substantially limit the utility of the system in today's high speed computer applications particularly.

A typical non-matrix equipment in which time division multiplexing (TDM) has been used in the past is a data communication system using an Electronic Industrial Assn. interface specification RS-232 which covers serial data transmission. In such a system controlled by time division multiplex (TDM), there is a need for a master clock not only for the multiplexing equipment but also for clocking all parts of the system. Furthermore, there must be a matching of the time division multiplex to other equipment such that the port of the switching system must have the speed and format of the connecting device either adjusted to the connecting equipment or programmed into some control portion to allow the machine to handle the signals.

Time division multiplex techniques involve interspersing of pulses in a serial string to produce a single bit stream from many sources. The rotation is fixed, similar to the fixed input of the present invention. The reverse action occurs at the other end of the serial bit stream in which a TDM spits out in *fixed* order the serial input, each bit of the serial stream being put in a different output port. By contrast, the present invention has the advantage of addressable outputs, changeable connections under program control and the ability to monitor the connection data by the simple expedient of opening a gate to match the proper input.

THE ADVANTAGES OF THE PRESENT INVENTION

The advantage of the transfer bus matrix over time division multiplex switching equipment or electromechanical (space division) switching equipment is one of cost, size, space and reliability.

In particular, the present invention, upon command, creates a connection between any input and any output which is indepedent of speed and eliminates the requirements for a master system clock. Each transfer bus has its own multiplex clock and there is no need for it to synchronize the equipment external to the individual transfer bus matrix. There is also no need for a master clock in the three stage transfer bus matrix nor the need to synchronize all of the transfer bus matrix clocks. The transfer bus matrix, both single and multistage can be, in fact, independent of speed, protocol, code and whether the system is synchronous or asynchronous. It imposes no limitations on speed of operation within the format and type of equipment for which the particular transfer bus matrix is designed. Unlike, the TDM approach, the transfer bus matrix does not require a common piece of electronic signal equipment in addition to the central control logic. Microprocessor control is particularly advantageous and easily applied to the transfer bus matrix, even with complex multi-stage matrices. Furthermore, matching of the time division multiplexing equipment to other equipment such that the port of the switching system must have the speed and format of the connection selection device is completely eliminated. Such matching is complicating because the TDM must either be adjusted to the connecting equipment or programmed into some control portion to allow the machine to handle the signal typical of the equipment that is being used.

THE FEATURES OF THE PRESENT INVENTION

The present invention has to do with means to provide connections and monitor and control such a switching system. Signal connections involve frequent short time slice connections of all designated input and output combinations. This involves simultaneous addressing of input and output for a designated time slice so that data, in the form of signal levels, can be transmitted in either direction during this period. The system permits simultaneous monitoring of the intelligence carried in either direction between these ports. Monitoring in this case enables a look at any entire time slice of intelligence which is being transmitted, not just the fact that connections have been made. The monitor and control function can be applied to a single matrix and, if a large matrix is involved, will allow automatic monitoring or sensing of connections which have been made as well as the data passing through desired connections. Then it will function to complete the connection of input to output in accordance with signal line information in less time than would be possible by manual action in response to visual stimuli.

The present invention is applicable to any switching system which employs multiple inputs and outputs, and in particular has advantageous application to a multiple stage matrix array wherein at least one of the stages has multiple substages of matrices. In such a multiple stage arrangement, the substages each include their individual transfer bus matrix enabling any input of a given substage matrix to be connected to any output of that substage. Individual control and monitoring means is provided within each substage matrix for controlling timed sequential connection and monitoring the full signal throughputs.

Means is provided for interconnecting an input from one substage to an output of another substage in order to provide a non-blocked path toward the desired output in accordance with the plan of the contemporaneously filed application entitled, "Three Stage Minimum Configuration Non-Blocking Matrix".

More specifically, the present invention also provides a transfer bus matrix to be applied to a multi-stage matrix having multiple inputs to be connected to non-busy outputs. Address means is responsive to connection requirements. Monitor means is provided, possibly for the first time in such a simple manner, to monitor the intelligence in the signal and take it to a selected remote location for study.

In complex multistage matrices coordinating control means is required to select connections to provide appropriate outer connections through the system and connect selected inputs to selected non-busy outputs. This preferably is done in response to human requirements and preferably controlled by microprocessor or computer means. The application of the present invention to multistage matrices is particularly advantageous. In such situations the substages of each stage are provided with individual monitoring as well as control means which are subject to logic for that substage matrix and the monitoring means is input into specific logic, allowing monitoring of all intelligence for the complete stage, and finally non-blocked monitoring for the matrix system as a whole. The data from the monitoring means may be employed in various data processing applications.

For a better understanding of the present invention, reference is made to the accompanying drawings in which.

Figure 2:
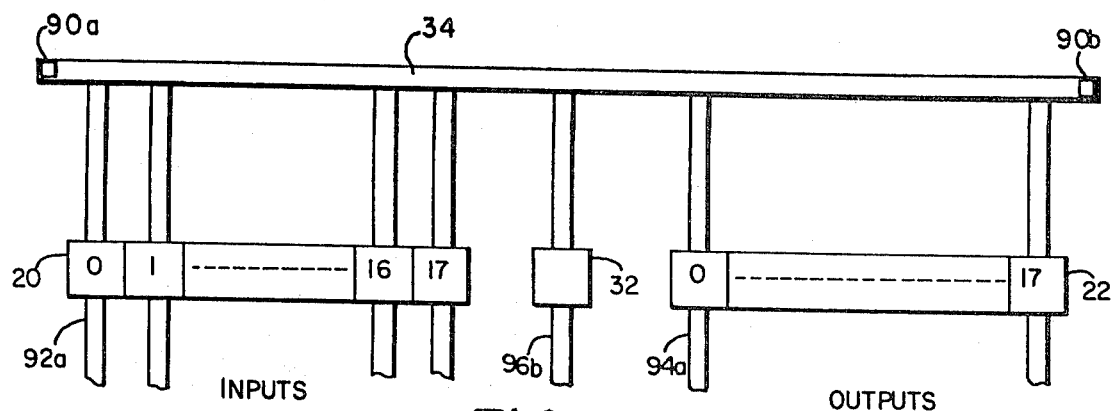
FIG. 2 is a schematic block diagram representing the signal portion of a single transfer bus matrix.

Referring first to FIG. 2, the structure of a transfer bus 34 is represented, in the preferred embodiment employing multiple conductors, for example, a set of 16 wires. The transfer bus 34 is treated as though it were a transmission line, but terminations do not exist in port or gate positions but only on the physical structure of the bus itself. Termination devices 90a and 90b are designed to ensure that signals carried on the transfer bus will make one transfer with no reflections. The input ports 20 and the output ports 22 are shown as gates or ports of a substage matrix in the mid-stage. There is no apparent difference between input ports 20 and output ports 22. The difference is in the direction in which the signals travel. In the preferred embodiment, ten signals travel from input to output and six signals travel from output to input. Therefore, the input ports 20 have circuitry to carry the input signals from external lines 92 through the ports 20 to the bus 34, while the output ports 22 have circuitry to carry those signals from the bus 34 to the lines 94. It is only this identification of signal direction which determines the difference between input and output ports. A monitor 32 carries all signals from the bus to the monitor line 96b and acts as a bridge monitor to observe all 16 of the signals in the preferred embodiment being carried on the transfer bus. Again, signal direction determines whether the port is labeled input, output, or monitor.

Figure 3:
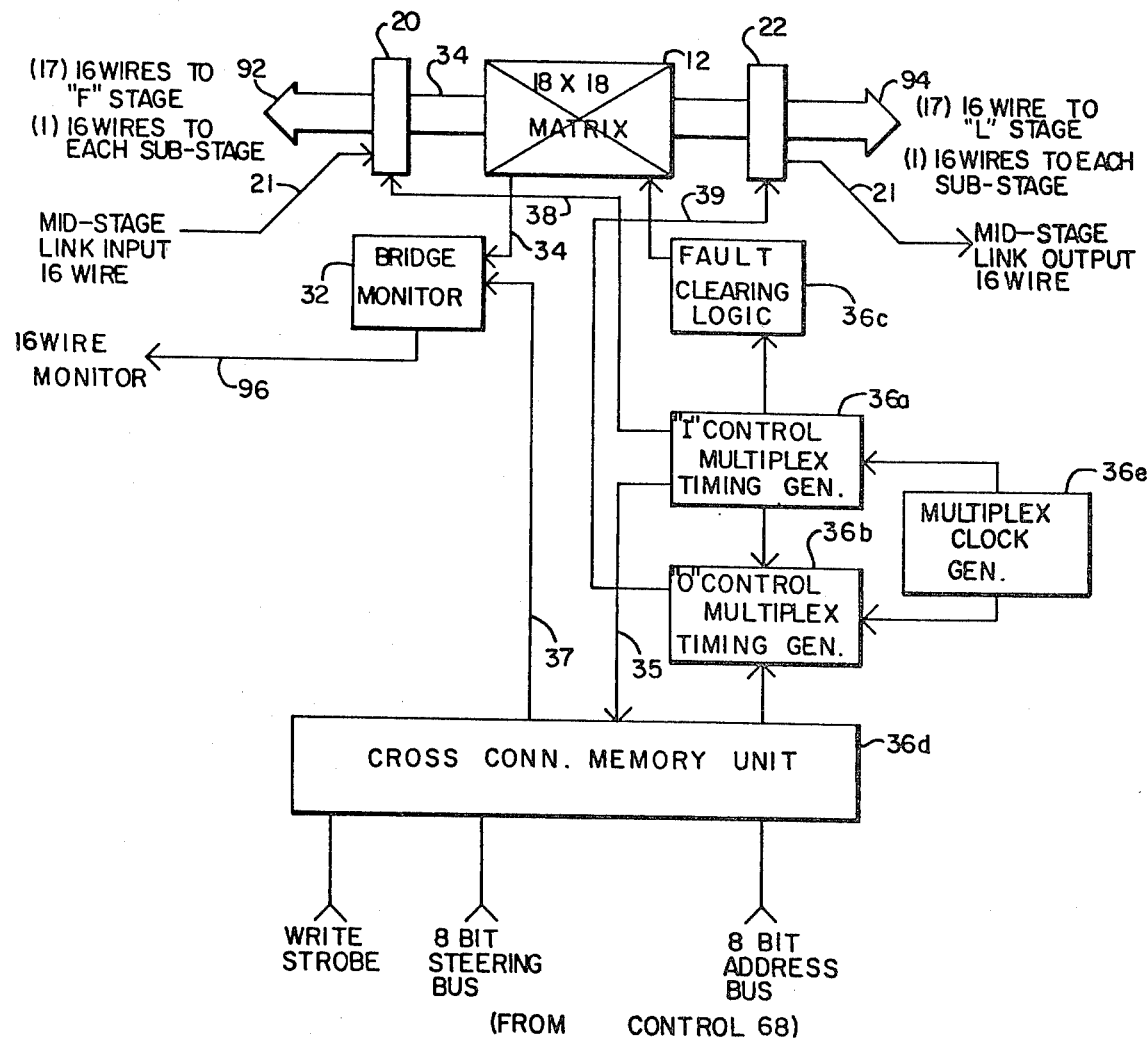
FIG. 3 is a schematic block diagram representing a single stage transfer bus matrix and its controls.

Referring now to FIG. 3, an individual transfer bus matrix is schematically shown with its controls. A mid-substage is selected as generally representative. Each substage shown or represented is provided by a transfer bus matrix in FIG. 1 each functionally similar to all of the others with differing numbers of input and output ports. In the FIG. 1 system, matrices of the first and last substages are the same size but a different size from those of the mid-substages, but their functions are identical. Only the count of input and output ports is different. Referring to FIG. 3 the multiplex clock 36e creates the timing for the input control multiplex timing generator 36a which opens each of the input ports 20 in predetermined order via control line 38. The input and output ports will be understood to be electronic gates or the equivalent. As each input binary number is generated, it is examined by the output control multiplex timing generator 36b which compares it against the address which has been stored in the cross-connect memory unit 36d. As shown, cross-connect memory unit 36d has inputs from an 8 bit address bus, an 8 bit steering bus, and a write strobe, all originating in M stage control 68 (see FIG. 1). The output control opens any output port which has stored in memory an input number that matches the current input number. In this way, one or more (or none, if that is the case) of the output gates 22 are opened via control line 39 at an input timing internal. The bridge monitor stored address (in cross connect memory unit 36a) is also verified against the code generated for the input interval which is received on control line 35, and, if it matches, the bridge monitor 32 is opened by control line 37 and transfers the data unidirectionally from the bus 34 to the 16 wire monitor 96 depicted in FIG. 3. The 16 wire monitor is specific to this particular preferred embodiment and could be designed to provide any number of signals of the transfer bus for the particular configuration for which it was built.

The control information which produces the repetitive openings during the proper time slice is created in the control unit 68 (for the described stage). The information is supplied to all substages as an input address on the eight bit address bus and an output number or the monitor identification on the eight bit steering bus. These buses run to all the substages of a stage. The particular substage is identified by a unique wire emanating from the central M stage control 68 to the unique substage and identified as the "write strobe". The write strobe identifies the substage that is to use the information that is on both buses. These control buses do not carry any signal data and do not operate at signal data speeds but operate only when changes in connections are desired.

Fault clearing logic 36c is used to ensure that the buses remain clear. The fault clearing logic is required only on certain types of electronic component solutions to the transfer bus matrix not presently being used. It is intended for use after each input time interval to ensure that the buses do not contain any latched electronic equipment which might be burned off should a gate fail and remain connected. In that way, the particular gate could be physically burned out. Certain methods of implementation might require such a disposition of a fault to prevent losing a substage due to one bad set of gates. In the preferred embodiments tested to date that mode of failure has not been calculated to be a high enough risk and such equipment has therefore been omitted.

Figure 1:
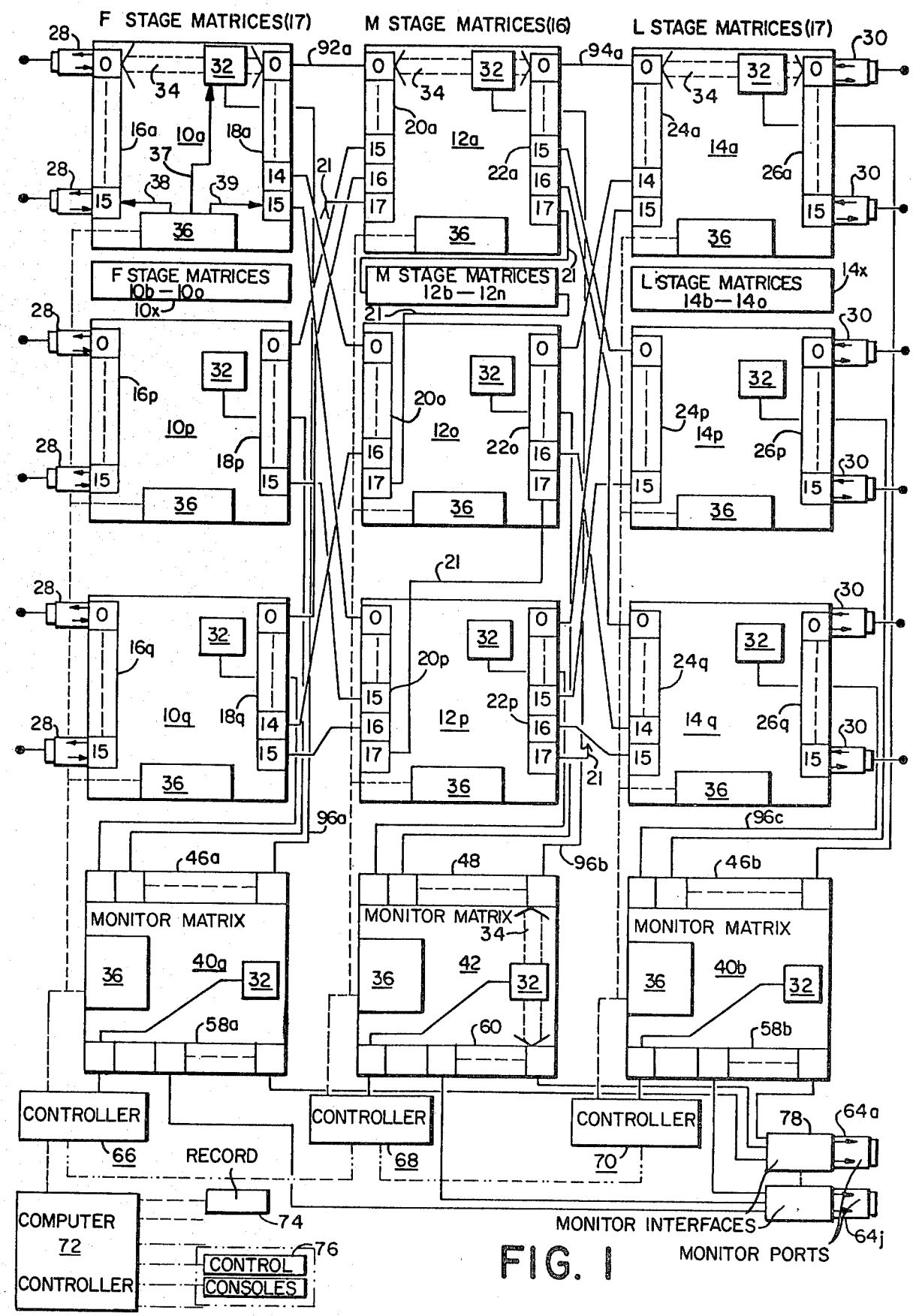
FIG. 1 illustrates a three-stage transfer bus matrix in accordance with the present invention in a highly schematic representation.

Referring now to FIG. 1 which shows the entire three stage transfer bus matrix and three monitor matrices 40a, 42, and 40b which act to allow any throughput to be monitored. A preferred basic matrix arrangement is defined in the comtemporaneously filed application entitled, "Three Stage Minimum Configuration Conditionally Non-Blocking Matrix". Utilizing the transfer bus substages in the three stage matrix allows the monitoring of any throughput signals on hard wired interconnecting links 92 and 94 such that each substage has an output port to each substage of the successive stage. In the preferred embodiment, the port number of a substage matches the stage number of the successive stage; and the port number of the successive stage matches the substage number of the previous stage. That allows ease of identification in the preferred embodiment; but any number assignment could be used.

Each individual substage is a transfer bus matrix. The substage of the F stage, identified as 10a contains, typically, all of the elements further defined in FIGS. 2 and 3, just as does the L stage and the M stage. The transfer bus as 34 is shown with the bridge monitor 32 and connected to monitor transfer bus 40a. Input ports control 38 as well as the output ports control 39 is provided. The input ports 16a through 16q of the respective F stage submatrices are similar to output ports 18a through 18q. The individual ports and are identified by number, for example, as input port 16a-1 through 16a-15; and the output as 18a-1 through 18a-15. Each port has as many connections to the transfer bus matrix as there are wires or channels and these individual wires may have designated signal direction. Input ports 20a through 20p, and 24a through 24p have similar connections with similar signal direction criteria exist in the M stage and L stage respectively. Similarly output ports 18a through 18q are similar to output ports 22a through 22p and 26a through 26q, respectively. No particular significance should be attached because FIGS. 2 and 3 describe specifically the M stage matrices and describe gating functions of input ports 20 and output ports 22. Input ports 16 of the F stage and output ports 26 of the L stage in the illustrated three stage matrix embodiment do literally differ in that one or both sets typically contain level conversion equipment. That is, they handle an Electronic Industries Association (EIA), specification No. RS-232 (Digital Communications) signal levels. Also, in the preferred embodiments, the ports are packaged slightly differently in terms of numbers of ports per printed circuit card in different stages.

The monitor lines which emanate from the bridge monitors 32 create all unidirectional signals traveling down the groups of lines 96a, 96b and 96c, respectively, toward the three monitor matrices 40a, 42, and 40b. The input ports of the three monitor matrices are controlled similarly to the other transfer bus substages. However, in the monitor transfer bus substages, all 16 signals are unidirectional, that is, going from the input ports 46a to an output port 58a, or input port 46b towards output port 58b, or the input port 48 to an output port 60. Similarly, the output ports 58a and 58b and 60 are unidirectional taking data from the transfer bus to the outside lines. The bridge monitor 32 of the monitor substages allows the stage controllers 66, 68, and 70 to monitor actual data flowing through the system under control of computer 72 and perform either reading of the data for control purposes or monitoring of the data for evaluation of the throughput in terms of its integrity.

It should be noted that all transfer bus matrices regardless of whether they are in an F, M, or L stage, or monitor matrix contain the same type of control regardless of the size of the matrix. The count of input ports is set into the count of I Control Multiplex Timing Generator 36a of FIG. 3 and is used to limit the number of time slices for each substage activity. The monitor matrices allow the connection of any monitor line from any substage of the particular stage in question to reach a monitor interface output device 78 which allows the signal from one of the three monitor matrices to reach the monitor test equipment ports 64a through 64j.

Each of the three stage controllers 66, 68, and 70 is supplied information by computer 72, perhaps better described as a controller. The controller 72 selects the path from a desired input port 28 to a desired output port 30 via the desired M stage substage matrix. It does this in accordance with the rules found in the contemporaneously filed application or more specifically for the preferred three stage matrix ordinarily by the least used or first available M stage substage matrix that has paths available. This information is then passed to the controllers 66, 68, and 70 to enable each stage to be individually controlled. However, for the sake of smoothness, in the preferred embodiment there are times when the commanding of the stages is done sequentially and other times when it is done simultaneously. Memory 74 retains a permanent record of the connections that have been made in chronological order while control consoles 76 permit manual or automatic inputs from which the desired external numbered connection requirements are provided.

The above described transfer bus matrix may be applied to individual substages or to an isolated matrix, or it may be applied to multistage matrices in which each of the stages has substage matrices in the form of transfer buses, as has been described. The invention has been described in broad terms and related to a specific embodiment. It will be understood by those skilled in the art that many modifications and variations of the systems described are possible. All such modifications and variations within the scope of the claims are intended to be within the scope and spirit of the present invention.

I claim:

1. A transfer bus matrix switching system for connecting selected input ports to selected output ports whereby multiple signals may be sequentially carried by the bus comprising:
   a bidirectional transmission line transfer bus providing a common parallel multi-line channel for all signals;
   a plurality of input bidirectional channels connected to the bus by individual gate means providing input ports;
   a plurality of output bidirectional channels connected to the bus by individual gate means providing output ports; and
   control means independent of the bus and input and output ports for selectively activating an input port and at least one output port contemporaneously and sequentially connecting such selected ports via the transfer bus.

2. The transfer bus matrix switching system of claim 1 in which the control means includes a multiplex clock generator and an input control multiplex timing generator acting upon individual gate means providing the input ports to sequentially permit signals through those input ports from the individual input channels to the transfer bus in a predetermined sequence.

3. The transfer bus matrix of claim 2 in which there is additionally provided an output control responsive to the multiplex clock generator and also responsive to memory means to provide sequential signals operating the output gates of the output ports in accordance with patterns dictated by the input port currently activated and output port memory instruction.

4. The transfer bus matrix of claim 3 in which steering data to select the proper combination of output gate means during an input address interval is provided by a write strobe signal to complete storage of the address data are provided by the memory means for repetitious use thereafter.

5. The transfer bus matrix switching system of any of claims 1 through 4 in which a monitor means is connected to the transfer bus in order to permit monitoring of the signal on the transfer bus at the time the monitor means is actuated.

6. The transfer bus matrix switching system of any of claims 1 through 4 in which a monitor having a plurality of conductors, each conductor connected to a corresponding conductor of the transfer bus, is actuated at the same time as an input port to the transfer bus.

7. A multistage matrix of three or more stages, each stage of which has a plurality of transfer bus matrix substages of the same type for connecting selected input ports of the first stage to selected output ports of the last stage whereby multiple signals may be sequentially carried on each substage transfer bus consisting of a bidirectional multi-line channel usable by all input and output ports of each substage, a plurality of input and output channels connected to each substage transfer bus by individual gate means providing substage input and output ports, and control means for each substage independent of the bus and input and output ports for selectively activating an input port and at least one output port contemporaneously and sequentially connecting such selected ports via the transfer bus for each substage.

8. The multistage matrix of claim 7 in which connections between transfer bus matrix substages from one stage to another consists of hard wiring including connection between various outputs and inputs of different substages of the adjacent stages.

9. The multistage matrix of claim 8 in which connections are made such that each substage is connected to every other substage of the previous stage.

10. The multistage matrix of claim 8 in which monitor means is provided for each substage transfer bus.

11. The multistage matrix of claim 9 in which monitor means is provided for each substage transfer bus.

12. The multistage matrix of claim 10 in which the monitor means for the various stages are, in turn, connected to a transfer bus monitor matrix for the stage.

13. The multistage transfer bus matrix of claim 11 in which the monitor means for the various stages are, in turn, connected to a transfer bus monitor matrix for the stage.

14. The multistage transfer bus matrix of claim 12 in which a transfer bus monitor having a plurality of conductors, each conductor connected to a corresponding conductor of the transfer bus, is actuated at the same time as an input port to the transfer bus.

15. The multistage transfer bus matrix of claim 13 in which a transfer bus monitor having a plurality of conductors, each conductor connected to a corresponding conductor of the transfer bus, is actuated at the same time as an input port to the transfer bus.

16. The multistage matrix of claim 14 in which control means for the stages are, in turn, coordinated by a system control means.

17. The multistage matrix of claim 15 in which control means for the stages are, in turn, coordinated by a system control means.

18. The multistage matrix of claim 16 in which the monitor means is also controlled by the system control means.

19. The multistage matrix of claim 17 in which the monitor means is also controlled by the system control means.

20. The multistage matrix of claim 19 in which the monitor matrices have outputs to monitor ports at which any selected signal may be monitored from any selected one of the various substage matrix locations and regardless of prior and simultaneous monitor activity at other other monitor ports.

* * * * *